United States Patent [19]

Smith et al.

[11] 4,072,437
[45] Feb. 7, 1978

[54] REMOVABLE CUTTER TOOTH

[75] Inventors: Garland Y. Smith, Hinsdale; Gerald R. Scott, Elmhurst; George A. Blazek, Woodridge; John L. Kowalski, Downers Grove, all of Ill.

[73] Assignee: Garland Smith Engineering Co., Inc., Hinsdale, Ill.

[21] Appl. No.: 699,427

[22] Filed: June 24, 1976

[51] Int. Cl.² .................. B26D 1/00; B26D 1/12; B23B 41/02
[52] U.S. Cl. ........................... 407/118; 407/34; 408/204; 408/703
[58] Field of Search .............. 29/95, 105 A; 408/204, 408/206, 703, 144

[56] References Cited

U.S. PATENT DOCUMENTS

| 2,638,021 | 5/1953 | Van Der Heiden | 408/204 |
| 2,756,648 | 7/1956 | Jones | 29/105 A |
| 3,351,998 | 11/1967 | Theiler | 29/105 A |
| 3,610,768 | 10/1971 | Cochran | 408/204 |
| 3,860,354 | 1/1975 | Hougen | 408/206 |

FOREIGN PATENT DOCUMENTS 655,420 7/1951 United Kingdom ............. 29/105 A

Primary Examiner—Harrison L. Hinson
Attorney, Agent, or Firm—Anthony S. Zummer

[57] ABSTRACT

A removable cutter tooth for use with a cylindrical tooth carrier is herein disclosed. The removable cutter tooth has an elongated base. A thrust pin is formed integral with, and perpendicular to, a portion of the elongated base. A rib is also formed integral with the elongated base. A cutting insert is connected to the elongated base and to the rib.

6 Claims, 6 Drawing Figures

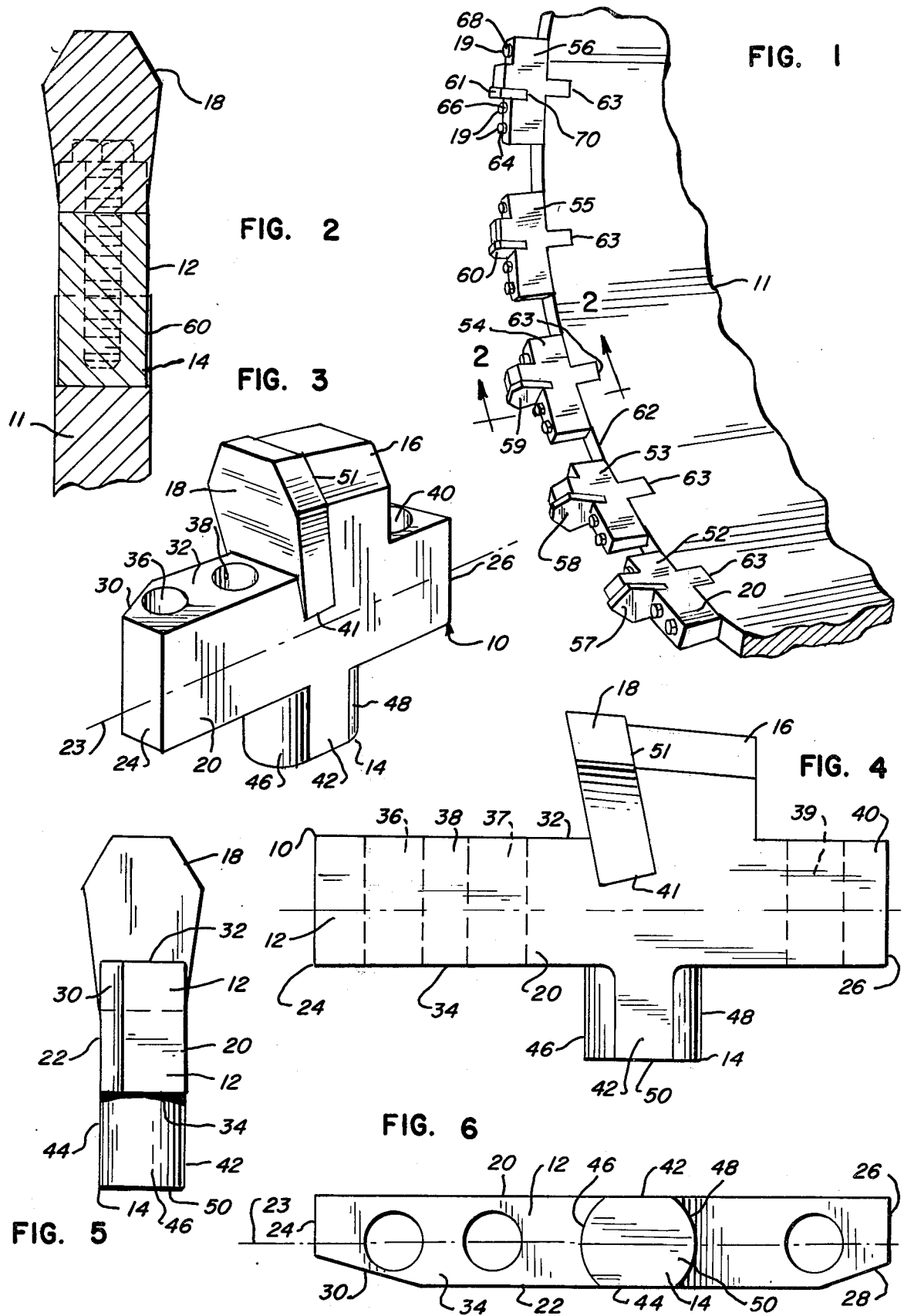

REMOVABLE CUTTER TOOTH

BACKGROUND OF THE INVENTION

Tapping machines, employing shell-type cutters, are commonly used for removing wall sections from water mains, pipelines and the like. The shell cutters which are presently employed commonly include tungsten carbide teeth, brazed into connection with raised portions of the shell cutter.

Conventional shell cutters suffer from several disadvantages. When such cutters are used in the field, there is always the chance that one or more of the brazed teeth will be broken off during use. Once one of the integral teeth is broken off, the remaining teeth may also break, in a chain reaction.

The conventional shell cutter and tapping machine are employed in the field, in conjunction with a gate valve. The gate valve is connected to a portion of pipeline, which is to be tapped. The tapping machine, having the shell cutter, is sealingly connected to the gate valve. It is difficult to make the connection cleanly since the pipeline to be tapped is usually buried and must be excavated. Hence, rock, soil or mud from the excavation can easily become entrapped with the shell cutter after the tapping machine is connected to the gate valve and the pipeline.

Since tapping cutters are attached to gate valves, which are in turn attached to water mains or pipes, the shell cutter is sealed away from view. The operator of the tapping machine does not become aware of any problems in the operation of the shell cutter until a substantial number of the integral teeth have been broken off or damaged in the chain reaction process. Once the teeth have been broken off, it is of course necessary that the cutter be removed; and a substitute cutter be put on in its place. Since the shell cutters are rather large cutting devices (some having diameters of 36 inches or more), it is inconvenient for users of the shell cutter to carry more shell cutters than are necessary to a particular repair or construction site. The repair or construction site is usually removed a substantial distance from shop facilities, thereby making it necessary to carry multiple shell cutters.

Tapping machines are also employed as plate tapping machines. The tapping machine is used to remove a coupon from a flat plate or from a section of metal having a large radius of curvature, such as a oil storage tank. A shell cutter having integrally formed teeth which is used for pipe tapping usually cannot be employed for plate tapping. The pipe tapping shell cutter has a relatively large number of teeth. All of these teeth do not cut a pipe or curved surface simultaneously. However, all of the teeth do engage a flat surface simultaneously. Use of a pipe tapping shell cutter for plate tapping imposes a large load on the tapping machine and in some instances can stop the tapping machine. Therefore, a second shell cutter having a relatively small number of teeth must be used for plate tapping. Thus, it is often necessary for the tapping machine user to purchase and carry about both pipe tapping shell cutters and plate tapping shell cutters.

A second disadvantage which shell cutters having integrally-formed teeth suffer from is that periodic maintenance and repair of the shell cutter is difficult to perform; and is expensive. For large shell cutters (such as the one mentioned above, having a 36-inch diameter), conventional milling machines and sharpening machines are simply too small to sharpen properly the integrally-formed teeth with the shell cutter. Specially built machines must be used to repair and maintain the shell cutters; and, of course, maintenance of the shell cutter by such machines adds considerably to the costs of repair of the shell cutter.

What is needed, then, is a removable tooth which is adapted to be selectively connected and disconnected from a shell cutter. The removable tooth should be small; and should be adapted to be quickly and easily connected to and disconnected from a shell cutter under field conditions.

SUMMARY OF THE INVENTION

A removable tooth for use with a cylindrical tooth carrier of a tapping machine is herein disclosed. The removable tooth includes a base. The base is shaped substantially as an elongated rectangle. A thrust pin is formed integral with, and perpendicular to, the base. A rib is formed integral with the base, and perpendicular thereto, opposite the thrust pin. A high-speed steel or tungsten carbide cutting insert is brazed to the rib. The cutting insert is somewhat larger in cross-section than the rib, to allow cutting clearance.

In use, the base of the removable tooth is affixed to a rim of the cylindrical tooth carrier. The cylindrical tooth carrier has formed therein a suitable relief to accommodate the thrust pin. The removable tooth is affixed to the cylindrical tooth carrier through the use of machine screws or the like. After a plurality of such removable teeth has been attached to the cylindrical tooth carrier at spaced regular intervals about the cylindrical tooth carrier, the cylindrical tooth carrier is then ready for use.

After use, or upon damage to one or more of the teeth, the shell cutter can be quickly and easily repaired by simply removing the damaged or worn teeth and substituting other teeth in their stead. Instead of carrying a number of shell cutters, for instance on a back of a truck, the operator of the tapping machine need only carry a pocketful of removable teeth in order to perform field repairs upon the cutter teeth. In addition, the cutter teeth may be removed for regular sharpening and maintenance in the shop; and can be sharpened or restored on conventional grinding equipment. Likewise, the teeth, when worn, can be simply disposed of and new teeth substituted on the shell cutter in their stead.

It is therefore a principal object of the present invention to provide a removable tooth, adapted for removable connection to a cylindrical tooth carrier of a tapping machine.

It is another object of the instant invention to provide a removable tooth which can be quickly and easily serviced.

It is a further object of the instant invention to provide a removable tooth adapted for removable connection with a cylindrical tooth carrier so that a single cylindrical tooth carrier can be used to tap both pipes and plates.

Other objects and uses of the present invention will become obvious to one skilled in the art upon a perusal of the following specification and claims in light of the accompanying drawing.

BRIEF DESCRIPTION OF THE DRAWING

FIG. 1 is a perspective view of a plurality of removable teeth, embodying the instant invention, positioned in staged engagement with a portion of a cylindrical tooth carrier;

FIG. 2 is a cross-sectional view of one of the removable teeth of the plurality, taken along Line 2—2 of FIG. 1;

FIG. 3 is a perspective view of another tooth of the plurality of removable teeth of FIG. 1;

FIG. 4 is a side elevational view of the removable tooth of FIG. 3;

FIG. 5 is a front elevational view of the removable tooth of FIG. 3; and

FIG. 6 is a bottom elevational view of the removable tooth of FIG. 3.

DESCRIPTION OF THE PREFERRED EMBODIMENT

Referring now to the drawing, and especially to FIGS. 1, 3 and 4, a removable cutter tooth embodying the present invention and generally indicated by numeral 10 is shown therein. The removable cutter tooth 10 is mounted on a portion of a cylindrical tooth carrier 11. The removable cutter tooth has an elongated base 12. A thrust pin 14 is formed integral with, and perpendicular to, elongated base 12. A rib 16 is also formed integral with, and perpendicular to, elongated base 12, opposite thrust pin 14. A cutting insert 18 is affixed to base 12 and rib 16, opposite thrust pin 14. A plurality of machine screws 19 releasably secures removable cutter tooth 10 to cylindrical tooth carrier 11.

Base 12 is a substantially rectangular base, having an inwardly-directed rectangular face 20 and an outwardly-directed face 22, positioned on opposite sides of a central longitudinal axis 23. An end 24 is formed integral with faces 20 and 22, perpendicular to axis 23. An end 26 is formed integral with faces 20 and 22, opposite end 24, perpendicular to axis 23. Outward face 22 also includes a back relief 28, formed integral with end 26 and outward face 22; and a front relief 30, formed integral with end 24 and outward face 22. Reliefs 28 and 30 taper toward axis 23 at an acute angle. Base 12 also includes a top face 32 and a bottom face positioned parallel to axis 23 and perpendicular to faces 22 and 24, and reliefs 28 and 30. A pair of forward machine screw apertures, respectively numbered 36 and 37, is formed in a forward portion 38 of base 12. A rear machine screw aperture 39 is formed in a rear portion 40 of base 12, opposite machine screw apertures 36 and 37. A cutting insert notch 41 is formed in top face 32 between screw aperture 37 and rib 16, immediately adjacent rib 16.

Thrust pin 14 is formed integral with bottom face 34 of base 12. Thrust pin 14 is disposed perpendicular to bottom face 34 of base 12 and axis 23 between screw apertures 37 and 39, and opposite cutting insert notch 41. Thrust pin 14 has a pair of flat faces 42 and 44, which are respectively formed integral with faces 20 and 22 of base 12. Faces 42 and 44 are positoned perpendicular to axis 23, and parallel to faces 20 and 22. Thurst pin 14 has a forward curved face 46, and a rear curved face 48. Curved faces 46 and 48 are each arcuate circular surfaces of a singular circular cylinder. A bottom face 50 is formed contiguous with curved faces 46 and 48, and flat faces 42 ad 44. Bottom face 50 is positoned parallel to axis 23.

Rib 16 is formed integral with top face 32 of base 12, adjacent to cutting insert notch 41. Rib 16 is positioned perpendicular to top face 32 of base 12. Rib 16 is also positioned opposite thrust pin 14, slightly offset toward end 26. Rib 16 has a width approximately twice that of thrust pin 14. Rib 16 terminates in a cutting insert face 51, adjacent to cutting insert notch 41. Cutting insert face 51 is positioned forward at an angle of 79° with respect to the top face 32 and axis 23.

Cutting insert 18 is positioned in cutting insert notch 41. Cutting insert 18 is brazed to cutting insert face 51 of rib 16. Cutting insert 18 has a cross-section, having the same shape as the cross-section of rib 16. The symmetry of cutting insert cross-section and rib cross-section provides a high degree of cutting strength to cutting insert 18. In addition, cutting insert 18 is slightly larger than rib 16, to give cutting clearance to rib 16 and to all of tooth 10. This is important so that cylindrical tooth carrier 11 can penetrate into a pipe being cut. Cutting insert 18 is positioned at a cutting angle of 79° with respect to face 32 and axis 23. The 79° cutting angle enables rapid cuts to be made on a pipe. Cutting insert 18 is composed of tungsten carbide in the present embodiment. Alternative suitable cutting materials can also be employed by one skilled in the art for cutting insert 18.

Referring now to FIG. 1, a plurality of removable teeth respectively numbered 52, 53, 54, 55 and 56, is mounted on cylindrical tooth carrier 11. Removable teeth 52, 53, 54, 55 and 56 each have a respective cutting insert 57, 58, 59, 60 and 61. Cutting insert 57 has a pentagonal cross-section; and extends the farthest from tooth carrier 11. Cutting inserts 58, 59 and 60 are hexagonal in cross-section. Cutting inserts 58, 59 and 60 are also progressively lower than cutting insert 57. Cutting insert 58 is lower than cutting insert 57. Cutting insert 59 is lower than cutting insert 58. Cutting insert 60 is is lower than cutting insert 59. Cutting insert 61 is trapezoidal in cross-section; and is lower than cutting insert 60. Each tooth, carrying a particular cutting insert 18, has a rib 16, having a cross-section of the particular cutting insert 18.

In use, removable tooth 10 is removably connected to cylindrical tooth carrier 11. Cylindrical tooth carrier 11 has a rim portion 62, having a plurality of constant curvature, open-sided apertures 63 formed therein at regular intervals. Apertures 63 have a constant curvature because they are drilled into rim 62. Apertures 63 are adapted to receive thrust pin 14 of removable tooth 10. Immediately adjacent an aperture 63, which receives thrust pin 14 of removable tooth 10, are a pair of front tapped apertures and a single rear tapped aperture.

Cylindrical tooth carrier 11 rotates at a selected cutting velocity in this embodiment of the invention. The direction of the cutting velocity at any tooth is defined to be forward for purposes of defining front and rear for a particular tooth. The front tapped apertures are in registry with the front machine screw apertures 36 and 37, respectively, of removable tooth 10.

Once thus positioned in registry, the plurality of machine screws 19 secures removable tooth 10 to cylindrical tooth carrier 11. Circular faces 46 and 48 allow removable tooth 10 to be rotated within aperture 63 slightly to bring apertures 36, 37 and 39 into registry with the front and rear tapped apertures. This is particularly important when interchanging teeth to allow use of teeth that are machined slightly outside tolerances. The plurality of machine screws 19 includes a pair of forward machine screws, respectively numbered 64 and 66, which is passed through apertures 36 and 37 and is threaded into engagement with the forward tapped apertures. Likewise, a rear machine screw 68 passes through aperture 39 and engages the rear tapped aperture. Cutting insert 18 is positioned in the direction of the cutting rotation of the cylindrical tooth carrier of the tapping machine. Thrust pin 14 receives most of the cutting thrust. Longitudinal axis 23 is positioned substantially parallel to the direction of cutting. Reliefs 28 and 30 are also aligned substantially parallel to adjacent portions of rim 62, so that base 12 does not extend beyond rim 62. Machine screws 64, 66 and 68 provide a small portion of the thrust load support. When tooth 10 engages a pipe to be cut, the cutting thrust on cutting insert 18 produces a torque, tending to lift end 24 clear of rim 62. Thus, the two forward machine screws prevent removable tooth 10 from rotating free of rim 62. Forward portion 38 is longer than rear portion 40 of base 12 in order to provide a relatively longer moment arm to hold forward portion 38 in contact with rim 62 when cutting thrust is applied to cutting insert 18. The other removable teeth are likewise attached to the cylindrical tooth carrier 11 in similar fashion.

One embodiment of the instant invention employs removable teeth having a variety of cutting insert shapes. As described above, removable teeth 52, 53, 54, 55 and 56 are spaced in order of descending sharpness around rim 62 of cylindrical tooth carrier 11, that is, the removable cutter tooth having the highest and sharpest cutting insert 57 is the leading tooth. In this embodiment, a removable tooth 52 is employed for an initial cut. Teeth having less sharp edges and having a lower profile follow behind the higher teeth and provide outboard clean-up. The lowest profile tooth 56, having a trapezoidally-shaped cutting insert 61, is the last tooth. This variation in cutting insert shape allows a more efficient cut to be made, and the cut to be made in less time. It may also be appreciated that removable teeth having identical cross-sections may also be employed.

The cylindrical tooth carrier 11, together with the removable teeth, ar part of a pipe-tapping machine. Pipe-tapping machines are used in the construction and repair of active water mains, pipelines and the like.

Customarily, a pipeline is excavated; and a T-fitting is connected to a section of a pipeline which is to be tapped. A gate valve is attached to the T-fitting. The gate valve and T-fitting are attached to the pipeline in the excavation; and dirt and rock can be trapped within the gate valve and T-fitting. Next, the tapping machine is sealingly connected to the gate valve.

The gate valve is then opened; and the shell cutter is advanced through the gate valve and T-fitting into contact with the pipeline to be tapped. The shell cutter is thus hidden from view. The shell cutter is then rotated to cut a section from the pipeline. The section is commonly known as a "coupon." In order that the coupon be removed from the pipe, it is necessary that the shell cutter be advanced a sufficient distance that the entire coupon is cut away from the pipeline. The cutting inserts of removable cutter teeth 10 are slightly wider than other portions of the removable cutter teeth or the wall of cylindrical tooth carrier 11. This is important because, unless cylindrical tooth carrier 11 can slide between the coupon and the rest of the pipeline as the cut is being made, upper and lower portions of the coupon cannot be freed from the pipeline.

Once the coupon is freed from the pipeline, a fluid from the pipeline flows into the T-fitting and gate valve. The shell cutter and coupon are then backed away from the pipeline; and the gate valve is closed.

Once the gate valve is closed, the tapping machine and coupon are removed from the gate valve; and the job is complete.

If removable tooth 10 is damaged or worn out, it can be removed easily from the cylindrical tooth carrier 11 by simply loosening machine screws 64, 66 and 68, and lifting the tooth from the rim 62. Another removable tooth 10 can be fitted to rim 62 by inserting its thrust pin 14 in one of the apertures 63. Machine screws 64, 66 and 68 are then insrted into machine screw apertures 36, 37 and 39, and tightened into engagement with rim 62. This operation can be performed in a matter of minutes. Thus, an operator of the tapping machine, employing a shell cutter having the instant removable teeth installed thereon, can quickly and easily replace the removable teeth when they become damaged or worn. Thus, expensive shipping charges do not have to be paid to bring extra shell cutters to a tapping site. The operator need only bring a single shell cutter and a pocketful of replacement removable teeth.

This replaceability of the removable tooth is particularly important in field operations, for which the tapping machine is designed. The opportunities for damaging teeth in the field are higher than they would be in a shop environment. Dirt and rock from the excavation are likely to work between the shell cutter and pipeline, and damage the removable tooth. In addition, the machine operator may allow the tapping machine to run while a number of teeth are broken before he becomes aware of the damage. This is because, as stated above, the shell cutter is sealed away from view.

Although the specific embodiment of the removable tooth described herein discloses removable teeth used for pipe tapping, removable tooth 10 is also useful for pipelate tapping operations. Cylindrical tooth carrier 11 has a relatively large number of apertures 63 positioned at regular intervals about rim 62. All of apertures 63 receive removable teeth 10 when a pipe is to be tapped or a curved surface is to be cut. The relatively large number of removable teeth are employed because only a few of the removable teeth are in cutting contact with the pipe or curved surface at any instant.

The same cylindrical tooth carrier can be quickly converted in the field to use for plate tapping. Most of removable teeth 10 are simply removed from rim 62. Three, four or five removable teeth 10 are left connected at regular intervals about rim 62. It is necessary to reduce the number of removable teeth connected to rim 62 because all of the removable teeth connected to rim 62 simultaneously engage a plate or shallow curved surface such as an oil storage tank wall. Therefore, in order to insure the same cutting resistance as that encountered with a pipe, the teeth have to be removed for plate tapping. The three, four or five removable teeth used for plate tapping can be either identical in configuration, or have staged cutting insert shapes as disclosed above for pipe tapping. Thus, instead of carrying extra shell cutters for plate tapping operations, the identical cylindrical tooth carrier can be used in conjunction with removable teeth 10 for both plate and pipe tapping operations.

It may be appreciated, then, that the instant invention provides a removable tooth which is economical and easy to manufacture; and which may be quickly and easily switched to and from various shell cutters.

Although a specific embodiment of the instant invention has been described in detail above, various modifications and changes in the instant invention will be obvious to one skilled in the art. It is to be expressly understood that the instant invention is limited in scope only by the appended claims.

What is claimed is:

1. A removable tooth for use with a cylindrical tooth carrier for cutting a coupon comprising: a substantially rectangular base having a pair of parallel faces, a plurality of midpoints between said parallel faces defining a central longitudinal axis, a first relief and a second relief formed integral with one face of said pair of parallel faces, each of said reliefs being positioned at an acute angle to said central longitudinal axis; a thrust pin formed integral with the substantially rectangular base at a third face of said substantially rectangular base and being adapted to engage a first portion of a cylindrical tooth carrier; an upstanding rib formed integral with a fourth face of the substantially rectangular base; a cutting insert connected to the substantially rectangular base and to the upstanding rib, said cutting insert being adapted to engage cuttingly a surface to be machined; and a plurality of apertures, each aperture being adapted to receive a machine screw, said plurality of apertures being positioned in said substantially rectangular base 2. A removable tooth for use with a cylindrical tooth carrier for cutting a coupon as defined in claim 1 in which said thrust pin has a pair of parallel longitudinal walls and a pair of circularly curved walls.

3. A removable tooth for use with a cylindrical tooth carrier for cutting a coupon as defined in claim 1 in which said upstanding rib is offset slightly from said thrust pin.

4. A removable tooth for use with a cylindrical tooth carrier for cutting a coupon as defined in claim 1 in which said upstanding rib has a cross-section corresponding to a cross-section of said cutting insert.

5. A removable tooth for use with a cylindrical tooth carrier for cutting a coupon as defined in claim 1 in which said substantially rectangular base has a relatively long first portion positioned adjacent said cutting insert and a relatively short second portion positioned adjacent said upstanding rib.

6. A removable tooth comprising: a substantially rectangular base, said substantially rectangular base having a central longitudinal axis, said substantially rectangular base having a first side face and a second side face, said substantially rectangular base having a pair of reliefs formed integral with the first side face, said reliefs being positioned at acute angles to said central longitudinal axis, said substantially rectangular base having a notch formed therein, said substantially rectangular base having a relatively long first portion and a relatively short second portion, said relatively long first portion having a first pair of apertures, each aperture being adapted to receive a machine screw of a first pair of machine screws, said relatively short second portion having a second aperture adapted to receive a second machine screw; a thrust pin formed integral with the substantially rectangular base and perpendicular to the central longitudinal axis opposite said notch, said thrust pin having a pair of parallel side walls, and a pair of circularly curving walls; an upstanding elongated rib formed integral with and perpendicular to said substantially rectangular base, said upstanding elongated rib being positioned opposite said thrust pin and adjacent said notch, said upstanding elongated rib having a desired cross-section; and a cutting insert positioned in said notch and brazed to said upstanding elongated rib, said cutting insert having a cross-section corresponding to the cross-section of said upstanding elongated rib, said upstanding elongated rib providing a thrust support to said cutting insert.

* * * * *

UNITED STATES PATENT OFFICE
CERTIFICATE OF CORRECTION

PATENT NO. : 4,072,437

DATED : February 7, 1978

INVENTOR(S) : Garland Y. Smith; Gerald R. Scott; George A. Blazek; and John L. Kowalski It is certified that error appears in the above-identified patent and that said Letters Patent are hereby corrected as shown below:

Column 6, Line 35, "pipelate" should be --plate--.

Signed and Sealed this

Sixteenth Day of May 1978

[SEAL]

Attest:

RUTH C. MASON
Attesting Officer

LUTRELLE F. PARKER
Acting Commissioner of Patents and Trademarks